United States Patent [19]

Whitney et al.

[11] Patent Number: 4,458,321
[45] Date of Patent: Jul. 3, 1984

[54] SELF-TEACHING ROBOT FEEDBACK SYSTEM

[75] Inventors: Daniel E. Whitney; Donald S. Seltzer, both of Arlington, Mass.

[73] Assignee: The Charles Stark Draper Laboratory, Inc., Cambridge, Mass.

[21] Appl. No.: 294,349

[22] Filed: Aug. 19, 1981

[51] Int. Cl.³ .......................... G05B 13/00; G06F 9/00
[52] U.S. Cl. .................... 364/513; 364/192; 364/170; 364/165; 318/568; 318/561
[58] Field of Search ............... 364/513, 157, 167, 170, 364/176, 175, 174, 148, 149, 150, 151, 152, 191-193, 165; 318/568, 561; 414/1

[56] References Cited

U.S. PATENT DOCUMENTS

| Re. 30,016 | 5/1979 | Hohn | 364/513 X |
| 3,109,970 | 11/1963 | Smyth | 364/165 X |
| 3,665,168 | 5/1972 | Canfield | 364/165 X |
| 3,917,930 | 11/1975 | Dawey et al. | 318/561 |
| 4,078,195 | 3/1978 | Mathias et al. | 318/561 |
| 4,140,953 | 2/1979 | Dunne | 364/513 X |
| 4,287,459 | 9/1981 | Dahlström | 364/513 X |

OTHER PUBLICATIONS

Nevins, J. et al., "Exploratory Research in Industrial Assembly Part Mating," Charles Stark Draper Laboratory, No. R-1276, 7th Report Covering Sep. 1, 1978 to Feb. 28, 1980, pp. 105-111, Prepared for National Science Foundation.

Primary Examiner—Gareth D. Shaw
Assistant Examiner—Ronni S. Malamud
Attorney, Agent, or Firm—Joseph S. Iandiorio

[57] ABSTRACT

A self-teaching RCC device robot feedback system including: a robot mechanism; an RCC device carried by the robot mechanism; a robot driver unit for directing motion of the RCC device in an environment; means for determining the displacement of an RCC device with respect to the robot; and an adaptive learning system, responsive to the means for determining displacement, for detecting a pattern of displacements of the RCC device relative to its environment and generating commands to the robot driver unit to direct motion of the RCC device.

2 Claims, 8 Drawing Figures

SELF-TEACHING ROBOT FEEDBACK SYSTEM

FIELD OF INVENTION

This invention relates to a self-teaching robot feedback system using a remote center compliance device.

BACKGROUND OF INVENTION

Conventional robot devices operate to assemble and mate parts or a part and a tool automatically. Typically, alignment errors are not detected or corrected.

RCC devices, which are passively compliant, are available for assembly, mating and insertion tasks where it is desired to quickly and easily accommodate for relatively small misalignments. Three different types of RCC devices are disclosed in U.S. Pat. Nos. 4,098,001, 4,155,169, U.S. Pat. No. 4,337,579 and incorporated herein by reference. These devices have now been instrumented, U.S. Pat. No. 4,316,329, incorporated herein by reference, so that they are able to passively adjust to assemble misaligned parts and also indicate a measure of the misalignment.

Typically industrial robots are taught by introducing information into a robot data base such as by moving the robot through a sequence of operations and recording the various forces, velocities, and/or displacements that occur. Such information might also be obtained from external sources such as CAD or CAM data bases generated during design and manufacture of a product. If the input data is not entirely accurate or the environment of the robot or the robot itself has been altered then the robot has to be re-taught. Re-teaching may also be required because of shifts in the workpiece or work site, temperature drift, tolerance variations, aging, and other short and long term variable effects.

Various sensing schemes are used to attempt to monitor the robot's operation and reflect its interaction with its work environment. The sensor readings may eventually become data for robot operation but it may not be assumed that this data is completely accurate. It is customary and proper in control theory to assume rather that all sensor readings are corrupted by noise of various kinds which may result in wasted time and energy as well as unstable and possibly damaging behavior. Present sensing schemes do not provide for long-term accumulation of experience, tracking of drift, correction of teaching or alignment errors, etc.

SUMMARY OF INVENTION

It is therefore an object of this invention to provide an improved self-teaching robot feedback system using an RCC device.

It is a further object of this invention to provide such a system which utilizes the accumulated experience of the robot over a period of time.

It is a further object of this invention to provide such a system which employs an instrumented RCC device to accommodate for displacements between the RCC device and workpiece and provide a measure of the displacements for adjusting the system to shift the RCC device position for subsequent operation.

This invention features a self-teaching RCC device robot feedback system including a robot mechanism and an RCC device carried by the robot mechanism. There is a robot driver unit for directing motion of the RCC device in an environment and means for determining the displacement of an RCC device with respect to the robot. An adaptive learning system responsive to the means for determining displacement detects a pattern of displacements of the RCC device relative to its environment arising from repeated executions of the same robot task and generates commands to the robot driver unit to direct motion of the RCC device. In a preferred embodiment the adaptive learning system includes an optimal linear estimator, optimal linear filter, or state observer/reconstructor. The generic term "Kalman Filter" is often used to denote such filtering or estimating techniques.

DISCLOSURE OF PREFERRED EMBODIMENT

Other objects, features and advantages will occur from the following description of a preferred embodiment and the accompanying drawings, in which.

Figure 5A:
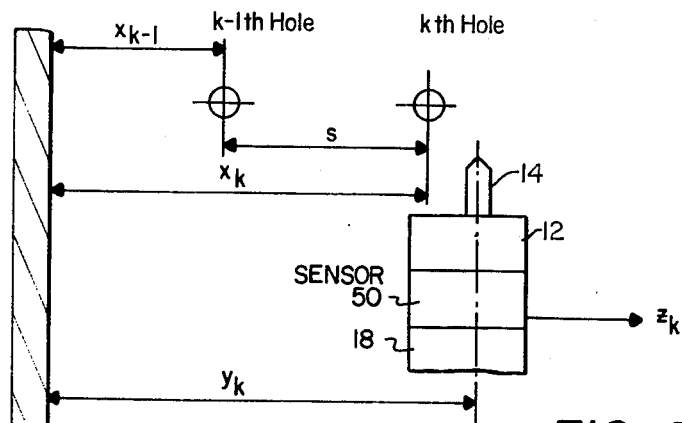
Figure 5B:
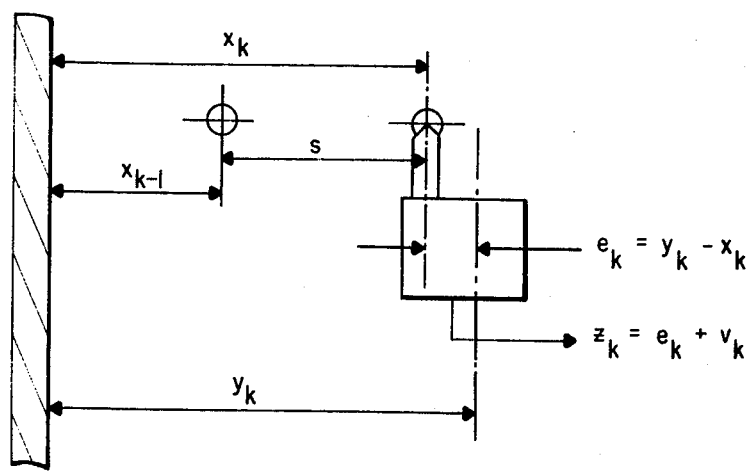
Figure 6:
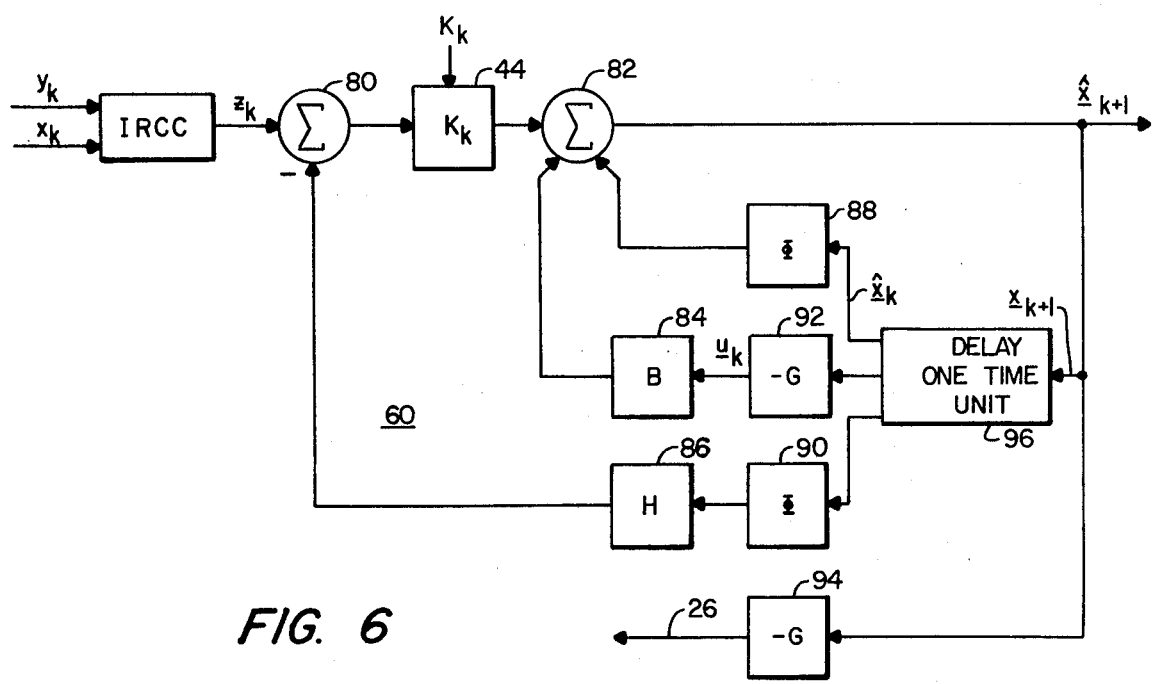
Figure 7:
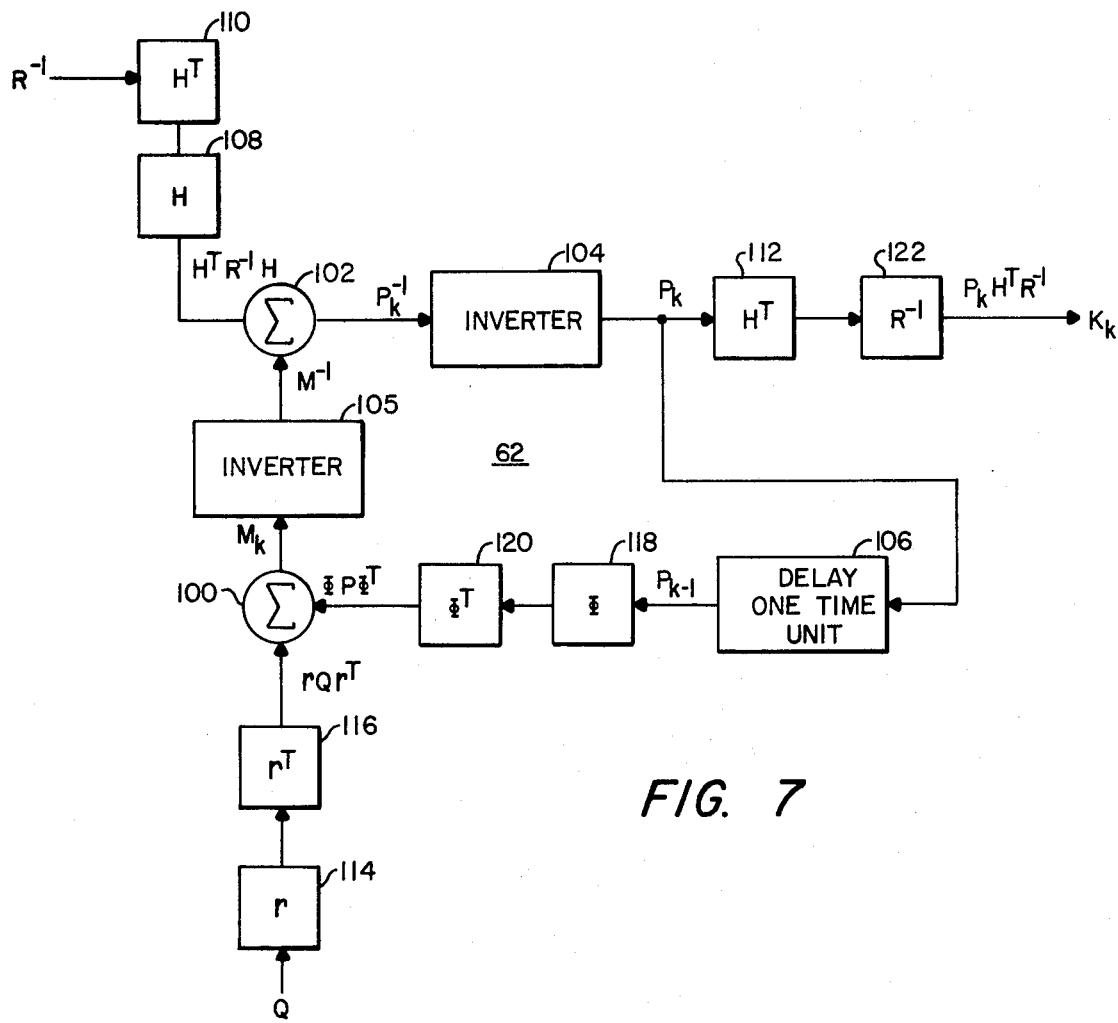

FIGS. 5A and B are schematic diagrams showing various dimensions involved in locating a peg in a hole using the system according to this invention;

FIG. 6 is a more detailed block diagram of a Kalman filter circuit of FIG. 5; and FIG. 7 is a more detailed block diagram of the Kalman filter gain circuit of FIG. 5.

Figure 1:
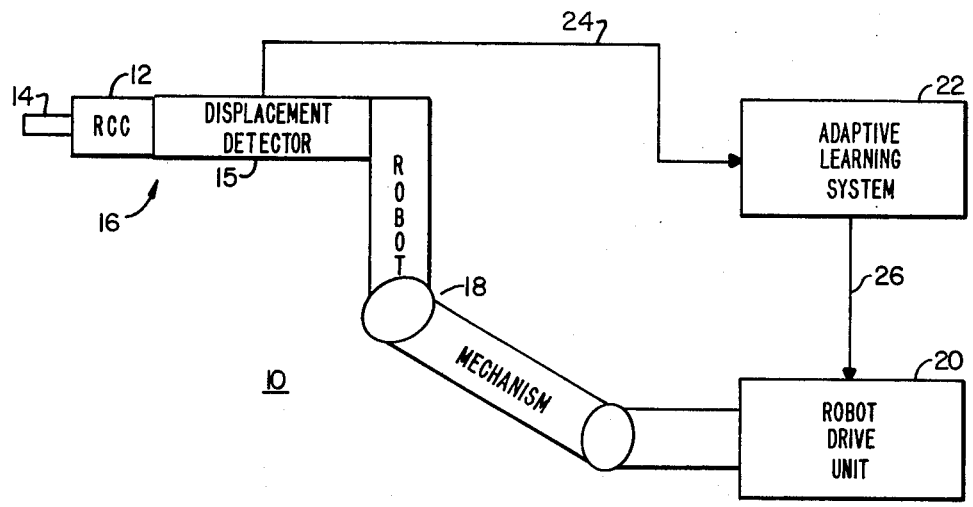
FIG. 1 is a block diagram of a self-teaching RCC device robot feedback system according to this invention.

There is shown in FIG. 1 a self-teaching RCC device robot feedback system 10 according to this invention including an RCC device 12 with operator member 14 interconnected with displacement detector 15. RCC device 12 and RCC displacement detector 15 may together be referred to as an instrumented remote center compliance device or IRCC device 16. Displacement detector 15 is mounted on a robot mechanism 18 driven by robot drive unit 20. IRCC device 16 senses displacement of operator member 14 as it engages the workpiece, and delivers a signal, which is a measurement of any displacement or misalignment, to adaptive learning system 22. RCC 12, due to its compliant properties, enables operator member 14 to engage a workpiece even though the workpiece and operator member 14 may be misaligned, and thereby eliminates wasteful hunting operations. However, measurements of any misalignment supplied by displacement detector 14 on line 24 enable adaptive learning system 22 to determine any trends in misalignment between the workpiece and operator member 14 and, over line 26, to adjust robot drive unit 20 accordingly.

Figure 2:
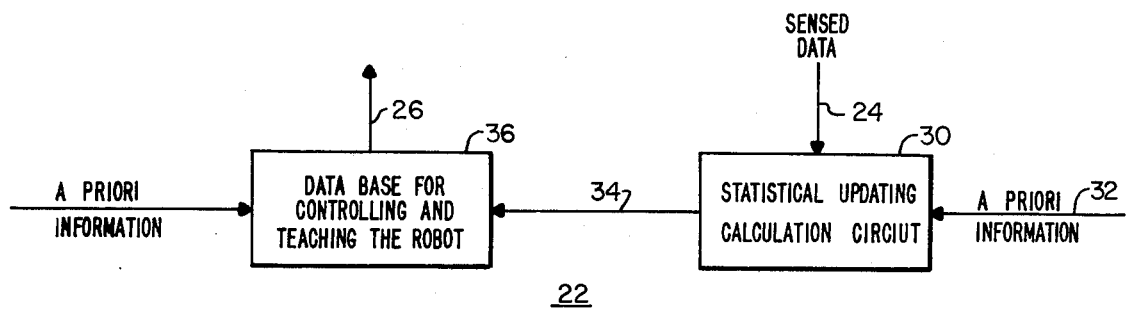
FIG. 2 is a more detailed block diagram of the adaptive learning system of FIG. 1.

Adaptive learning system 22 may include statistical updating calculation circuit 30, FIG. 2, which receives the sensed data on line 24 and may receive certain *a priori* information on line 32. The information on line 32 may, for example, take the form of estimates of statistics and probabilities which might alternatively be learned over time. The updated signal is provided on line 34 to the data base 36 for controlling and teaching the robot. Data base 36 also may receive *a priori* information such as that obtained by leading a robot manually through a sequence of operations, as discussed previously. The output from data base 36 on line 26 is submitted to robot drive unit 20 to directly drive robot mechanism 18.

Figure 3:
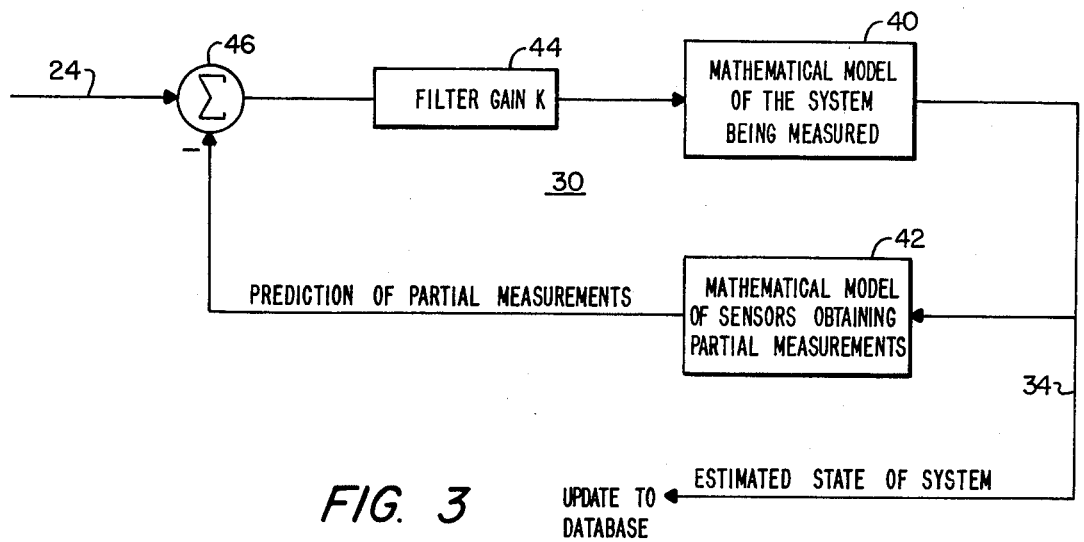
FIG. 3 is a more detailed block diagram of the statistical updating calculation block of FIG. 2.

Statistical upgrading calculation circuit 30 may be implemented with a Kalman filter circuit, FIG. 3, which includes a mathematical model of the system being measured, 40, and a mathematical model of sensors obtaining partial measurements, 42, along with a circuit 44 containing the filter gain K of the filter, and summing circuit 46. Sensed data on line 24 is combined in summer 46 with the prediction of partial measurements obtained from mathematical model 42. The output from summer 46 is multiplied by the gain K in circuit 44 and then submitted to mathematical model 40 of the system being measured. This provides an output equivalent to the estimated state of the system on line 34 which is fed back through mathematical model 42 and is also delivered to data base circuit 36.

Displacement detector 15 operates to provide a signal representative of the displacement of the operator member 14 with respect to a reference in the interior of the sensor. In the ideal case, the sensor provides signal e which is the difference between reference position y and operator member position x. In reality, signal e is corrupted by additive noise v so that the sensor's output is z, the sum of e and v. This output z is provided to Kalman filter circuit 60 in statistical updating calculation circuit 30.

Figure 4:
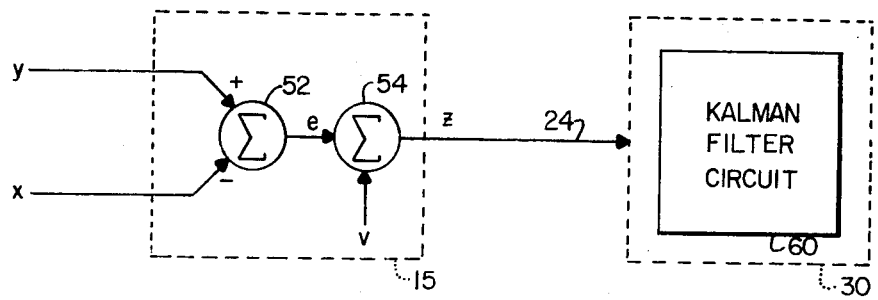
FIG. 4 is a more detailed block diagram of the displacement detector of FIG. 1 and the statistical updating calculation block of FIG. 2.

This description of the operation of the displacement sensor is shown schematically in FIG. 4, where summing circuit 52 represents the ideal operation of the sensor, determining the difference between sensor reference position y and operator member position x. Summing circuit 54 represents unwanted but unavoidable additive noise which corrupts signal e.

To illustrate the usefulness of this invention, consider the following simplified example. See FIG. 5. The robot is supposed to place the operator member 14 in a succession of holes, to perform an assembly, apply glue, etc., but cannot do so adequately because of errors in teaching or in the CAD data base which represents the holes. By means of this invention the error will be automatically discovered and corrected.

In FIG. 5A are shown two representative holes. Their positions are denoted $x_k$ and $x_{k-1}$ with respect to a reference in the robot's environment. The position of the robot (and of the sensor's reference) as it approaches the $k^{th}$ hole is denoted $y_k$. The spacing between the holes is denoted by s. The teaching error consists of teaching the robot the wrong value of s or equivalently of receiving an incorrect value of s from the CAD data base. Thus when the robot gets the operator member near the hole the operator member will be in the wrong position by an amount equal to the error in spacing s. If that error is not too large then, as the robot begins to insert operator member 14 into the $k^{th}$ hole, the operator member will displace slightly under the action of the compliant RCC and will come to rest in or part way in the hole, FIG. 5B. But the position of the operator member now will be $x_k$ corresponding to the hole position, whereas the robot's position will be a different value $y_k$, the originally taught but erroneous position. Thus $x_k$ will not equal $y_k$ and the displacement sensor will detect the difference.

The operation of the instrumented RCC device in conjunction with Kalman filter circuit 60 is explained in more detail for this example as follows: The positions of the k−1th hole and the kth hole may be expressed as $$x_k = x_{k-1} + s \quad (1)$$

where s is the distance between the two holes. The kth robot taught position with respect to the k−1th will then be:

$$y_k = y_{k-1} + s_o \quad (2)$$

where $s_o$ is the robot's initial estimated or taught distance between the hole positions. The robot actual performance in moving from one taught position to the next may then be expressed as:

$$y_k = y_{k-1} + s_o + u_{K-1} + w_{k-1} \quad (3)$$

where $u_{k-1}$ represents a correction factor to be calculated by the Kalman filter circuit and $w_{k-1}$ represents robot noise and general inability to achieve the $y_k$ target. Due to the accommodation of the IRCC device, the operator member will enter into a hole in spite of a misalignment error $y_k - x_k$, which the IRCC device accommodates the measures by means of the sensors.

If $e_k$ is defined as $$e_k = y_k - x_k \quad (4)$$

then the taught data should ideally be updated by:

$$u_k = -e_k \quad (5)$$

Thus for the next hole, the k+1th hole, the misalignment will not be so great as it was with the kth hole. In fact, $e_k$ is unknown, but $z_k$, the output of the displacement sensor, is known:

$$z_k = e_k + v_k \quad (6)$$

where $v_k$ represents unavoidable additive noise in the displacement sensor.

The job of the Kalman Filter is then to estimate, in spite of noise inputs w and v, the robot's true position, the hole's true position, the true spacing s, and/or the spacing error $s_o - s$. Both the hole position $x_k$ and the robot position $y_k$ may be estimated using system state equations (1) and (3). Alternatively, only the error $e_k$ may be estimated, which requires only one system state equation, obtained by subtracting equation (3) from equation (1):

$$e_k = e_{k-1} + s_o - s + u_{k-1} + w_{k-1} \quad (7)$$

Finally, an estimate of spacing error $s_o - s$ may also be obtained by defining a new system state variable. This will be explained below. First a review of general Kalman Filter theory will be presented.

In a Kalman filter the system state equations are expressed in general in a standard form as follows:

$$\underline{x}_k = \Phi \underline{x}_{k-1} + B\underline{u}_{k-1} + \Gamma \underline{w}_{k-1} \quad (8)$$

where $\underline{x}_o$ is the given initial state. $\underline{x}_{k-1}$ is the system state vector including one or more pieces of information sufficient to describe the state of the system at time k−1. $\underline{u}_{k-1}$ is a vector of controls to be applied at time k−1, and $\underline{w}_{k-1}$ is a vector of disturbance noise inputs at time k−1. Included in vector $\underline{x}$ is any information needed to describe the robot's position or the positions of other things in the robot's environment, such as taught locations, which may need to be estimated or measured, or whose performance is to be monitored. Equation (8) demonstrates the combination of these quantities using matrices Φ, B and Γ to produce $\underline{x}_k$, the condition of the system at time k. Matrix Φ is the state transition matrix, matrix B is a control transfer matrix, and matrix Γ is a noise transfer matrix.

There is the following correlation between equations (7) and (8):

| Standard Form | Name | Example |
|---|---|---|
| $x_k$ | State vector | $e_k$ (Scalar) |
| $u_k$ | Control | $u_k$ (Scalar) |
| $w_k$ | Noise | $w_k + s_o - s$ (Scalar) ($s_o - s$ is an unknown constant and is included with the noise) |
| Φ | | 1 |
| B | | 1 |
| Γ | | 1 |

The Kalman Filter equation represents the behavior of $\hat{\underline{x}}_k$, which is the filter's estimate of the true system state, $\underline{x}_k$:

$$\hat{\underline{x}}_k = \Phi\hat{\underline{x}}_{k-1} + B\underline{u}_{k-1} + K_k[\underline{z}_k - H\bar{\underline{x}}_k] \quad (9)$$

where $\hat{\underline{x}}_o$ is the initial given or estimated value of $\underline{x}_o$. $K_k$ is the filter gain matrix calculated infra; $\underline{z}_k$ is the vector of measurements at time k:

$$\underline{z}_k = H\underline{x}_k + \underline{v}_k \quad (10)$$

where H represents scaling or combination of components of $\underline{x}_k$ and $\underline{v}_k$ represents noise on the measurements. $\bar{\underline{x}}_k$ is the best estimate of $\underline{x}_k$ prior to measuring and obtaining $\underline{z}_k$.

Filter theory establishes that if the best estimate of $\hat{\underline{x}}_{k-1}$ is known, namely $\hat{\underline{x}}_{k-1}$, and if $\underline{u}_{k-1}$ is known and the noise $\underline{w}_{k-1}$ is zero mean, then the best value for $\bar{\underline{x}}_k$ is gotten from equation (8), using $\hat{\underline{x}}_{k-1}$ in place of $\underline{x}_{k-1}$, and zero in place of $\underline{w}_{k-1}$:

$$\bar{\underline{x}}_k = \Phi\hat{\underline{x}}_{k-1} + B\underline{u}_{k-1} \quad (11)$$

Thus $\underline{z}_k - H\bar{\underline{x}}_k$ is the difference between $\underline{z}_k$ and the best prediction of $\underline{z}_k$, given $\hat{\underline{x}}_{k-1}$ and $\underline{u}_{k-1}$. $K_k$ multiplied by the difference is used as a correction term in the filter.

Filter theory provides the following equations for determining filter gain $K_k$, where superscript T means matrix transpose and superscript −1 means matrix inverse:

$$K_k = P_k H^T R^{-1} \quad (12)$$

where $$M_k = \Phi P_{k-1} \Phi^T + \Gamma Q \Gamma^T \quad (13)$$

and $$P_k = (M_k^{-1} + H^T R^{-1} H)^{-1} \quad (14)$$

and $P_o$ = covariance matrix of the error in $\underline{x}_o$:

$$P_o = E[(\hat{\underline{x}}_o - \underline{x}_o)(\hat{\underline{x}}_o - \underline{x})^T] \quad (15)$$

where E denotes average, and Q = covariance matrix of noise $\underline{w}$:

$$Q = E[\underline{w}\underline{w}^T] \quad (16)$$

and R = covariance matrix of noise $\underline{v}$:

$$R = E[\underline{v}\underline{v}^T] \quad (17)$$

In terms of the present example:

| Standard Form | Example |
|---|---|
| $P_k$ | $P_k$ (scalar) |
| $M_k$ | $M_k$ (scalar) |
| Q | q = variance of w (scalar) |
| R | r = variance of v (scalar) |
| H | 1 |
| Equation (11) | $\bar{e}_k = e_{k-1} + u_{k-1}$ (18) |

Equation (18) does not include $s_o - s$ because that is of course unknown. Therefore the best estimate of $e_k$ before measuring is obtained from equation (18) using known $e_{k-1}$ and $u_{k-1}$. The Kalman filter equation for this example may be written:

$$\hat{e}_k = \hat{e}_{k-1} + u_{k-1} + K_k[z_k - (\hat{e}_{k-1} + u_{k-1})] \quad (19)$$

with $$K_k = \frac{1}{r} P_k \quad \text{(like equation (12))} \quad (20)$$

$$\frac{1}{P_k} = \frac{1}{M_k} + r \quad \text{(like equation (14))} \quad (21)$$

$$M_k = P_{k-1} + q \quad \text{(like equation (13))} \quad (22)$$

This example is pursued further, for example, as the robot moves from hole 3 to hole 4. $\hat{e}_3$ and $P_3$ have been calculated and according to equation (5) the stored robot command in seeking hole 4 will be modified by the amount $u_3 = -\hat{e}_3$. Thus if it is estimated that the robot was 0.01 inch too far to the right, this amount is deducted from the a priori position of the robot at hole 4 so that the robot comes closer to hole 4 than it did to hole 3. When the robot reaches hole 4, the IRCC device is read, and using equation (6), $z_4$ is obtained. $P_3$ is known and $M_4$ can be calculated from equation (22) for use in equation (21) to calculate $P_4$, from which in turn can be calculated $K_4$ from equation (20). There is now available all the information needed to calculate $\hat{e}_4$ from equation (19):

$$\hat{e}_4 = \hat{e}_3 + u_3 + K_4[z_4 - (\hat{e}_3 + u_3)] \quad (23)$$

However, since $u_3 = -\hat{e}_3$ in this specific example, equation (23) reduces to $$\hat{e}_4 = K_4 z_4 \quad (24)$$

In more complex examples this reduction does not occur, but it does occur here because no estimate is being made of the ongoing error $s_o - s$. Rather, corrections are made to the previous alignment without removing its cause. Therefore $\hat{e}_k$ does not depend on $\hat{e}_{k-1}$: there is no learning concerning the hole spacing error, that is $s_o - s$, in the filter as thus far expressed.

To provide this learning facility, the hole spacing error must be a system state variable, and it must be estimated as well. The hole spacing error may be designated as d:

$$d = s_o - s \quad (25)$$

As a constant, its system equation is simply:

$$d_k = d_{k-1} \tag{26}$$

The combination of equations (26) and (7) yields two system state equations:

$$e_k = e_{k-1} + d_{k-1} + u_{k-1} + w_{k-1} \tag{27}$$

$$d_k = d_{k-1} \tag{28}$$

which can then be put in the standard form of equation (8).

$$\begin{bmatrix} e_k \\ d_k \end{bmatrix} = \begin{bmatrix} 1 & 1 \\ 0 & 1 \end{bmatrix} \begin{bmatrix} e_{k-1} \\ d_{k-1} \end{bmatrix} + \begin{bmatrix} 1 \\ 0 \end{bmatrix} u_{k-1} + \begin{bmatrix} 1 \\ 0 \end{bmatrix} w_{k-1} \tag{29}$$

Thus it is apparent that $$\Phi = \begin{bmatrix} 1 & 1 \\ 0 & 1 \end{bmatrix} \tag{30}$$

$$B = \begin{bmatrix} 1 \\ 0 \end{bmatrix} \tag{31}$$

$$\Gamma = \begin{bmatrix} 1 \\ 0 \end{bmatrix} \tag{32}$$

Estimating both e and d, $u_k$ is used as the correction:

$$u_k = -(\hat{e}_k + \hat{d}_k) \tag{33}$$

Thus, analogously, the filter operates as follows:

$$\begin{bmatrix} \hat{e}_k \\ \hat{d}_k \end{bmatrix} = \begin{bmatrix} 1 & 1 \\ 0 & 1 \end{bmatrix} \begin{bmatrix} \hat{e}_{k-1} \\ \hat{d}_{k-1} \end{bmatrix} + \begin{bmatrix} 1 \\ 0 \end{bmatrix} u_{k-1} +$$

$$K_k \left[ z_k - H \left( \begin{bmatrix} 1 & 1 \\ 0 & 1 \end{bmatrix} \begin{bmatrix} e_{k-1} \\ d_{k-1} \end{bmatrix} + \begin{bmatrix} 1 \\ 0 \end{bmatrix} u_{k-1} \right) \right] \tag{34}$$

where $$z_k = [1\ 0] \begin{bmatrix} e_k \\ d_k \end{bmatrix} + v_k \tag{35}$$

so that $$H = [1\ 0] \tag{36}$$

The procedure required to go from hole 3 to hole 4 is analogous to that given above. It is assumed that there is available $e_3$, $d_3$ and $P_3$ and a 2×2 matrix, and that according to equation (33) the stored robot command aiming for hole 4 is modified by $-(\hat{e}_3 + \hat{d}_3)$. $z_4$ can be obtained using equation (35) by reading the IRCC when the robot has reached hole 4. Equation (13) is then used to calculate $M_4$, another 2×2 matrix, and equation (14) uses $P_4$ and also a 2×2 matrix. This also allows the calculation of $K_4$ from equation (12). Since R is still a scalar and $H^T$ is a 2×1 vector, $K_4$ also resolves into a 2×1 vector.

The information is now available to estimate equation (11) and equation (9) (expressed here as equation (34)) to obtain $\hat{e}_4$ and $\hat{a}_4$, and the cycle is complete. The result overall is that e and d are both estimated and successively learned with greater and greater accuracy. ê goes toward zero and d goes toward the actual spacing error $s_o - s$. Thus the spacing has been learned. To allow a robot to learn some other feature of itself or its environment requires that a new $\Phi$, B, Q, R, H, etc., be determined such that equation (8) represents the environment, the new features, and the robot correctly. Examples include tracking a conveyor with uncertain and unsteady velocity, estimating hole positions in two dimensions or positions with variable spacing errors, tracking dimensional drift in manufactured parts, sensing deterioration of robot performance, and so on. This method may be implemented in hardware or programmed on a microprocessor or on a digital computer, for example. Note that, in this example, spacing error $s_o - s$ was estimated without ever being directly measured. To ensure that this is possible, filter theory also provides rigorous mathematical tests, called observability tests to determine in a given case whether or not a proposed filter will work.

Kalman filter circuit 60 may be implemented by a pair of summing circuits 80, 82, FIG. 6, and a number of matrix multiplier circuits including control transmission matrix circuit 84, observation matrix 86, system state transition matrix circuits 88 and 90, and control gain matrix circuits 92 and 94. There is also included a one time unit delay circuit 96 and the filter gain matrix 44.

The output from filter 60, $\hat{x}_{k+1}$, is delivered to and multiplied by matrix 94, whose output provides the next drive signal $u_{k+1}$ to the robot unit 96 to matrix multiplication circuits 88, 92, and 90. The output from matrix multiplication circuit 90 is delivered to and multiplied by matrix 86 and then combined with the input signal $z_k$ in summer 80. The output of summer 80 is multiplied by the filter gain matrix 44 and then combined in summer 82 with the outputs from matrix multiplications 84 and matrix 88 to form the final output of Kalman filter circuit 60.

The Kalman filter gain $K_k$ may be calculated by filter gain circuit 62, FIG. 7, which includes a pair of summing circuits 100, 102, inverters 104, 105, and one time unit delay circuit 106. Filter gain circuit 62 also includes a number of matrix multiplying circuits including observation matrix H, 108, the transposed observation matrices $H^T$, 110 and 112, noise transmission matrix $\Gamma$, 114, and the transposed noise transmission matrix $\Gamma^T$, 116. Also included are system state transition matrix $\Phi$ 118 and the transposed matrix $\Phi^T$, 120, thereof, and the inverse of covariance matrix $R^{-1}$, 122.

In operation, the output from summer 102 represents the inverse of the covariance matrix of error in the estimates after measurement, $P_k^{-1}$. This is input to inverter 104. The output of inverter 104, the covariance matrix of error in the estimate after measurement, $P_k$, is then multiplied by matrix 112, the output of which is multiplied by matrix 122 to provide the final output, $K_k$, the Kalman filter gain. The output from inverter 104, $P_k$, is also provided to delay 106, whose output $P_{k-1}$ is delivered to and multiplied by matrix $\Phi$ 118, whose output in turn is delivered to and multiplied by matrix $\Phi^T$ 120, whose output is delivered to summer 100. The other input to summer 100 is derived from matrix $\Gamma^T$, 116, via the output of matrix $\Gamma$, 114, which receives at its input the signal Q representative of the covariance of noise $\underline{w}$. Thus the output from summer 100, $M_k$, via inverter 105, becomes the inverse, $M^{-1}$, input to summer 102. The other input to summer 102 is derived from matrix 108, which in turn receives an input from matrix 110 that is provided with the inverse of the informational matrix $R^{-1}$.

Other embodiments will occur to those skilled in the art and are within the following claims:

What is claimed is:

1. A self-teaching RCC device robot feedback system comprising:

a robot mechanism;

an RCC device carried by said robot mechanism;

a robot drive unit connected to said robot mechanism for directing motion of said RCC device in an environment;

means mounted to at least one of said robot mechanisms and said RCC device for determining the displacement of said RCC device with respect to said robot and generating a displacement signal indicative thereof; and an adaptive learning system including a data base containing data for controlling said robot drive unit and updating means responsive to said means for determining displacement, for determining a pattern of displacements of said RCC device relative to the environment arising from repeated executions of the same robot task and generating updated signals to said data base to update the data therein, said data base being responsive to said updated signals for generating updated command signals to said robot driver unit to direct motion of said RCC device.

2. The system of claim 1 in which said adaptive learning system includes a Kalman filter circuit for receiving said displacement signal and providing said updated signals to said robot driver unit.

* * * * *